US010803139B2

(12) United States Patent
Gabriel et al.

(10) Patent No.: US 10,803,139 B2
(45) Date of Patent: Oct. 13, 2020

(54) INSTRUMENT DISAMBIGUATION TO FACILITATE ELECTRONIC DATA CONSOLIDATION

(71) Applicant: INTUIT Inc., Mountain View, CA (US)

(72) Inventors: Michael R. Gabriel, Mountain View, CA (US); Rachel Jack, Mountain View, CA (US); Roger Meike, Mountain View, CA (US); Ian Maya Panchevre, Mountain View, CA (US); Glenn Scott, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 392 days.

(21) Appl. No.: 15/796,665

(22) Filed: Oct. 27, 2017

(65) Prior Publication Data

US 2019/0130042 A1    May 2, 2019

(51) Int. Cl.
*G06F 16/00* (2019.01)
*G06F 16/955* (2019.01)
(Continued)

(52) U.S. Cl.
CPC ......... *G06F 16/9554* (2019.01); *G06F 16/23* (2019.01); *G06F 16/27* (2019.01);
(Continued)

(58) Field of Classification Search
CPC .. G06F 16/9554; G06F 16/9574; G06F 16/93; G06F 16/23; G06F 16/27; G06F 16/2365; G06Q 20/023; G06Q 20/042; G06Q 20/10; G06Q 20/389; G06Q 30/04; G06Q 40/12

See application file for complete search history.

(56) References Cited

U.S. PATENT DOCUMENTS

| 5,594,226 A | 1/1997 | Steger |
| 7,721,961 B2 * | 5/2010 | Silverbrook ......... H04N 3/1568 235/385 |

(Continued)

FOREIGN PATENT DOCUMENTS

| KR | 2012-0123230 A | 11/2012 |
| WO | 2007144708 A1 | 12/2007 |

*Primary Examiner* — Noosha Arjomandi
(74) *Attorney, Agent, or Firm* — Patterson + Sherian LLP

(57) ABSTRACT

Embodiments presented herein provide systems and methods for disambiguating the identity of a record to which information imported from a third-party data source pertains. For example, in one embodiment, a record-storage service creates a record of a transaction between a first entity and a second entity. Upon receiving an indication that an instrument will be used to transfer a value for the transaction, the record-storage service associates a code to be printed on the instrument with the record and sends the code to an application that will be used to generate the instrument. Subsequently, the record-storage service receives information imported from electronic records provided by a third-party institution. The information also includes a code provided on the instrument and a status. Upon determining that the code provided on the instrument matches the code associated with the record, the record-storage service updates the record to reflect the status.

20 Claims, 7 Drawing Sheets

(51) Int. Cl.
  *G06F 16/23*  (2019.01)
  *G06F 16/27*  (2019.01)
  *G06F 16/957*  (2019.01)
  *G06Q 20/02*  (2012.01)
  *G06Q 20/10*  (2012.01)
  *G06Q 20/38*  (2012.01)
  *G06Q 20/04*  (2012.01)
  *G06F 16/93*  (2019.01)
  *G06Q 30/04*  (2012.01)
  *G06Q 40/00*  (2012.01)

(52) U.S. Cl.
  CPC .......... *G06F 16/93* (2019.01); *G06F 16/9574* (2019.01); *G06Q 20/023* (2013.01); *G06Q 20/042* (2013.01); *G06Q 20/10* (2013.01); *G06Q 20/389* (2013.01); *G06Q 30/04* (2013.01); *G06Q 40/12* (2013.12)

(56) References Cited

U.S. PATENT DOCUMENTS

| | | | | |
|---|---|---|---|---|
| 9,928,379 | B1* | 3/2018 | Hoffer | G16H 50/70 |
| 10,158,632 | B2* | 12/2018 | Hanifen | H04W 12/0608 |
| 10,460,734 | B2* | 10/2019 | Jones | G10L 17/26 |
| 10,503,822 | B1* | 12/2019 | Spencer | G06F 40/197 |
| 2002/0013711 | A1* | 1/2002 | Ahuja | G06Q 40/02 |
| | | | | 709/206 |
| 2006/0144924 | A1 | 7/2006 | Stover | |
| 2011/0066550 | A1 | 3/2011 | Shank et al. | |
| 2012/0130888 | A1* | 5/2012 | Cooke | G06Q 20/3272 |
| | | | | 705/39 |
| 2013/0018780 | A1 | 1/2013 | Waltman | |
| 2013/0179336 | A1* | 7/2013 | Lyons | G06Q 20/3276 |
| | | | | 705/39 |
| 2014/0195626 | A1* | 7/2014 | Ruff | H04W 12/0806 |
| | | | | 709/206 |
| 2014/0223177 | A1* | 8/2014 | Dempster | H04L 9/0825 |
| | | | | 713/165 |
| 2014/0287688 | A1* | 9/2014 | Dempster | H04L 67/1095 |
| | | | | 455/41.2 |
| 2014/0310380 | A1* | 10/2014 | Newman | H04L 67/06 |
| | | | | 709/217 |
| 2015/0102102 | A1* | 4/2015 | Heim | G06Q 10/087 |
| | | | | 235/382 |
| 2015/0120567 | A1* | 4/2015 | Van Rooyen | G06F 21/10 |
| | | | | 705/59 |
| 2015/0199405 | A1* | 7/2015 | Redlich | G06F 16/2465 |
| | | | | 707/770 |
| 2017/0302645 | A1* | 10/2017 | Ducker | H04L 63/0876 |
| 2018/0060954 | A1* | 3/2018 | Yin | G06F 21/316 |
| 2018/0174188 | A1* | 6/2018 | Wilkinson | G06Q 30/0261 |
| 2018/0232526 | A1* | 8/2018 | Reid | G06F 21/602 |
| 2019/0042989 | A1* | 2/2019 | Scott | G06Q 10/0633 |
| 2019/0130042 | A1* | 5/2019 | Gabriel | G06Q 20/042 |

* cited by examiner

INSTRUMENT DISAMBIGUATION TO FACILITATE ELECTRONIC DATA CONSOLIDATION

BACKGROUND

Field

Embodiments presented herein generally relate to processing data imported from a third-party data source in an electronic record system. More specifically, systems are disclosed for disambiguating the identity of a transaction for which an instrument is used to effectuate a value transfer.

Related Art

Data sharing between applications allows users to apply functionality of multiple applications to a single data set without manually rekeying the data set into a different proprietary format for each application. Data sharing reduces the time needed to consolidate related digital information stored in disparate data repositories into a single electronic record. Electronic records provide many useful and convenient benefits in a variety of industries. For example, electronic records can be readily backed up in multiple repositories to ensure data is not lost in the event of a system failure. Electronic records can also be readily made available through computing networks for rapid access (e.g., for searching and data analysis). Since electronic records provide so many benefits, many organizations convert paper records to electronic records (e.g., through scanning). Electronic records can be stored blockchains, hash chains, and related structures to prevent unauthorized modification. Blockchain transaction records are redundantly stored in many computing devices across a peer-to-peer network. If one copy of the blockchain is compromised and altered, the alteration can be readily detected when the altered copy is compared to other copies in the peer network.

Data sharing is useful in many contexts. Application programming interfaces (APIs) and authentication standards facilitate rapid and secure data sharing between network-connected software services. For example, a user may wish to import data provided by one Internet service into a different Internet service (or a local standalone application) for processing and analysis. To facilitate data transfer between different applications across the Internet, some software vendors provide open APIs that allow Internet applications to be accessed programmatically by authorized third-party programs. To allow applications to access data from other services, a user typically has to authenticate with the services that provide the data. The Internet Engineering Task Force (IETF) has developed the Open Authorization (OAuth) 2.0 standard to allow a user to authorize third-party applications to access protected Internet resources without disclosing the user's credentials for the Internet resources to the third-party applications.

SUMMARY

One embodiment of the present disclosure includes a method for automated instrument disambiguation in an electronic record system. The method generally includes receiving, at a server via a computing network, a description of a transaction and an indication that an instrument will be used to transfer a value associated with the transaction from a first entity to a second entity; generating an electronic record of the transaction based on the description; storing the electronic record in an electronic data repository accessible via the computing network; associating a first code to be included on the instrument with the electronic record in the electronic data repository; sending the first code from the server to a first application associated with the first entity via the network; receiving, at the server from a second application associated with the second entity via the electronic network, an indication of a second code and a transaction status; determining the second code matches the first code; and updating the electronic record to reflect the transaction status based on the determination.

Another embodiment provides a computer-readable storage medium having instructions, which, when executed on a processor, perform an operation comprising: receiving, at a server via a computing network, a description of a transaction and an indication that an instrument will be used to transfer a value associated with the transaction from a first entity to a second entity; generating an electronic record of the transaction based on the description; storing the electronic record in an electronic data repository accessible via the computing network; associating a first code to be included on the instrument with the electronic record in the electronic data repository; sending the first code from the server to a first application associated with the first entity via the network; receiving, at the server from a second application associated with the second entity via the electronic network, an indication of a second code and a transaction status; determining the second code matches the first code; and updating the electronic record to reflect the transaction status based on the determination.

Still another embodiment of the present disclosure includes a processor and a memory storing a program which, when executed on the processor, performs an operation comprising: receiving, at a server via a computing network, a description of a transaction and an indication that an instrument will be used to transfer a value associated with the transaction from a first entity to a second entity; generating an electronic record of the transaction based on the description; storing the electronic record in an electronic data repository accessible via the computing network; associating a first code to be included on the instrument with the electronic record in the electronic data repository; sending the first code from the server to a first application associated with the first entity via the network; receiving, at the server from a second application associated with the second entity via the electronic network, an indication of a second code and a transaction status; determining the second code matches the first code; and updating the electronic record to reflect the transaction status based on the determination.

DETAILED DESCRIPTION

Figure 1:
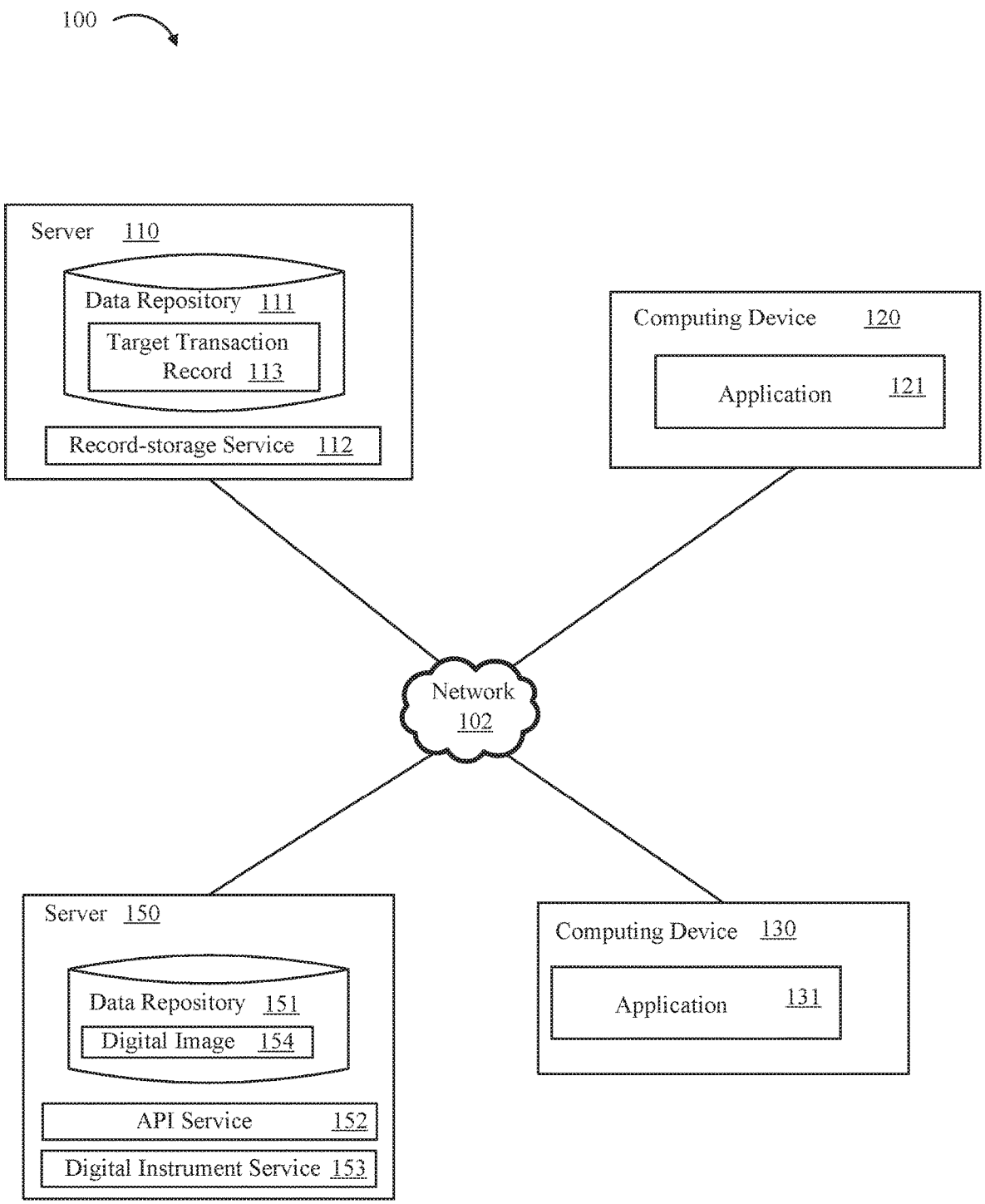
FIG. 1 illustrates a computing network environment in which systems of the present disclosure can operate, according to one embodiment.

Embodiments presented herein provide systems and methods for disambiguating the identity of a record to which information imported from a third-party data source pertains. For example, in one embodiment, a record-storage service creates a record of a transaction between a first entity and a second entity. Upon receiving an indication that an instrument (e.g., a check) will be used to effectuate a value transfer between the two entities for the transaction, the record-storage service associates a code to be printed on the instrument with the record and sends the code to an application that will be used to generate the instrument. Subsequently, the record-storage service receives information imported from electronic records provided by a third-party institution with which the second entity has an account (e.g., via an API). The information describes an instrument that was received as a deposit to the second entity's account. The information also includes a code provided on the instrument and a status (e.g., "pending" or "posted"). Upon determining that the code provided on the instrument matches the code associated with the record, the record-storage service updates the record to reflect the status.

In most industries, accurate record keeping is desirable. In some industries, such as accounting, accurate record keeping is required by law and records are subject to audits to ensure strict compliance. To facilitate error detection and correction in accounting records, double entry accounting is typically used. In double entry accounting, every transaction is recorded twice: in a first ledger for an account from which the transaction amount is deducted and in a second ledger for an account into which the transaction amount is deposited.

In triple entry accounting, a shared ledger that is trusted by both parties is used. Each transaction is cryptographically sealed when it is recorded in the shared ledger (which may be a distributed electronic ledger such as a blockchain structure). An interlocking system of accounting records results, making it very difficult for transaction records to be falsified. The shared ledger may be associated with an electronic accounting system (e.g., a cloud-based software service) that can effectuate value transfers completely without requiring any exchange of paper documents or validation information from data repositories outside of the electronic accounting system. Since the value exchange (e.g., payment) is effectuated intrinsically within the accounting system, there is no disassociation of the value exchange and the transaction corresponding transaction record. As a result, there is generally no ambiguity about which transaction a particular value exchange (e.g., payment) is meant to consummate.

However, for traditional transactions in which instruments (e.g., checks or money orders) are exchanged, the process is more complicated. When a buyer and a seller may make a traditional transaction with each other via accounting software, the amount to be exchanged for the transaction is typically recorded in an accounts-receivable ledger for the seller and in an accounts-payable ledger for the buyer. However, depending on the form of payment used (e.g., credit card, money order, check, etc.), the accounting software may be obliged to wait for deposit/withdrawal information from one or more third parties (e.g., the buyer's bank, the seller's bank, etc.) to verify that the exchange has been finalized (e.g., that a check cleared).

Unfortunately, third party systems may provide the deposit/withdrawal information in such a way that context is lost, thereby making it difficult for the accounting software to map the exchange to the proper transaction. For example, the third party may make the information available through a web API (or the accounting software may have to scrape the information from a secure web page) days or weeks after the transaction was first noted in the accounts-receivable ledger and the accounts-payable ledger. Thus, the date of the deposit/withdrawal posted by the third party may not match the date the transaction was initiated. Furthermore, the amount of the deposit/withdrawal may not be unique because other transactions in the intervening time may be recorded for the same amount. This is particularly prevalent where transactions are repetitive and fixed rate.

If a payment is made by check and a third party's system posts an image of the check, information on the image of the check (e.g., an amount, a payer, an address of the payer, an account number, and a routing number) may not be posted in a computer-readable format. And even if the accounting software can read information from the image, such as through Optical Character Recognition (OCR), there may nevertheless not be enough information or context to unambiguously map the check to the correct transaction. For example, suppose the check was written to an Internet service provider. The amount listed on a check may be a standard monthly amount that the Internet service provider charges to all customers who have signed up for a certain package and, therefore, the Internet service provider cannot distinguish the correct account to credit based only on the amount of the check. Many other complexities exist. For example, the Internet service provider may have more than one customer with the same name; the name on the check may not be the name of the person for whom the payment is being made (e.g., the payer may be paying on behalf of a spouse, a child, or tenants living in a rental property belonging to the payer, or payer's last name may have changed since the check was printed due to a marriage, etc.); the address may not be the service address, since the check may have been drawn from an old checkbook that was printed before the payer moved or the payer may be paying on behalf of someone else; the payer may have elected not to have the account number or the routing number stored in the electronic records kept by the Internet service provider; or there may be more than one open invoice listed on the customer account with the same amount due (e.g., if the payer owes $50 for a recurring monthly fee and the payer also owes a one-time $50 installation fee). These are but a few examples.

Accordingly, in traditional transaction systems, ambiguities often arise about the transaction to which a payment is intended to apply. Because existing systems are not be equipped to handle such ambiguity, it often falls to a human operator to inspect the instruments effectuating transactions, such as checks, and to contact one or more of the parties to the transaction in order to resolve any ambiguity. This manual process of updating the transaction records is more expensive, less efficient, and still not without its own human-induced errors. In either case, instrument disambiguation is a non-trivial problem that cannot readily be automated in existing systems.

Systems disclosed herein use a code that uniquely identifies a transaction and preserves an association between a transaction and the instrument used to effectuate the transaction even when information about the instrument is gathered and stored by disparate software application at different stages of a clearing process. For example, when an image of an instrument is posted by a third-party data system, the software can identify the code in the image and map information associated with the image to the transaction based on that code. The software can update the transaction record without requiring any human input or labor for disambiguation.

FIG. 1 illustrates a computing network environment 100 in which systems of the present disclosure can operate, according to one embodiment. As shown, the environment 100 includes a network 102, a first computing device 120, a second computing device 130, a server 110, and a server 150.

Computing device 120 may comprise a general or special purpose computing system hosting software applications that may be installed and run locally or may be used to access remote applications (e.g., running on remote servers). For example, a remote server may include an API for a device, such as computing device 120, to connect to the remote server and exchange data. The computing device 120 may be, for example, a smart phone, a tablet computer, a laptop computer, a desktop computer, or any other computing device or system capable of running software applications and communicating over the network 102. Examples outlined herein describe the computing device 120 as being operated by a first user. The term "first user" may refer to a person, an organization (e.g., a company), or some other type of entity.

Similarly, computing device 130 may comprise another general or special purpose computing system like computing device 120. Examples outlined herein describe computing device 130 as being operated by a second user. The term "second user" may refer to a person, an organization (e.g., a company), or some other type of entity.

Application 121 and application 131 may comprise software for generating, recording, and/or analyzing electronic records (e.g., of transactions). Application 121 and application 131 may be configured to communicate transaction information to the record-storage service 112 of server 110 for storage in the data repository 111. When a transaction (referred to herein as the "target transaction") between the first user (of computing device 120) and the second user (of computing device 130) occurs, the first user may validate or approve of the target transaction via application 121. Similarly, the second user may also validate or approve of the target transaction via application 131. Application 121 and/or application 131 communicate a description to the record-storage service 112 of server 110. The record-storage service 112 creates a target transaction record 113 in the data repository 111 based on the description. The first user and the second user can view the target transaction record 113 via application 121 and application 131, respectively. However, once the target transaction record 113 has been created, the record-storage service 112 does not allow either user to alter the target transaction record 113. In other words, while both users have permissions to read existing records, request that new records be created, and submit additional information for inclusion in existing records to the record-storage service 112, neither user has permission to erase or overwrite information in an existing record. In this manner, the record-storage service 112 of server 110 prevents tampering.

Typically, the target transaction involves transfer of a value (e.g., a currency value, such as a dollar amount) from the first user to the second user. For example, the first user may use a negotiable instrument such as a check, a promissory note, a sight draft, a bill of exchange, or a certificate of deposit, or a non-negotiable instrument, such as a postal money order or a pay order, to transfer the value associated with the target transaction to the second user. The instrument may have physical form (e.g., a check printed on paper) or may be in an electronic form (e.g., an electronic check). In either case, the first user may select an option provided by the application 121 to transfer the value via the instrument. After the first user initiates the transfer, the application 121 may send a network communication to the record-storage service 112 (and/or to the application 131) indicating that the value will be transferred via the first user's selected instrument. Application 131 may also send a similar network communication to the record-storage service 112 indicating that the value will be transferred via the instrument.

Upon receiving an indication that the value will be transferred via an instrument, the record-storage service 112 associates a code with the record of the target transaction stored in the data repository 111. The code may thereafter serve as a unique identifier of the target transaction. The code may be, for example, an alphanumeric code, a bar code, a quick response (QR) code, or another type of code. In one embodiment, the record-storage service 112 generates the code. In another embodiment, the application 131 generates the code and sends the code to the record-storage service 112 after receiving an indication from application 121 that the value will be transferred via an instrument. In either case, the record-storage service 112 associates the code with the target transaction record 113 via a data structure that allows the target transaction record 113 to be looked up based on the code (e.g., in a database). Thereafter, the record-storage service 112 sends the code to the application 121 and to the application 131 (if the code was generated at the record-storage service 112) via the network 102 and each application (121 and 131) associates the code with the target transaction. In some embodiments, the code includes a unique portion (to uniquely identify the transaction) as well as a non-unique portion, such as a portion including transaction information (e.g., an amount of the target transaction, a routing number, an account number, a user name, an address, an institution name, or other information).

After the application 121 receives the code, the application 121 adds the code to the instrument that will be used to transfer the value associated with the target transaction. For example, if the instrument is an electronic check, the application 121 adds the code to a digital representation of the check (e.g., a file or a data structure). If the instrument is a physical check, the application 121 can print the code onto the check via a printer. In an alternative embodiment, the check may have been pre-printed beforehand with a unique identifier and a series of machine-readable bubbles that a user can darken manually to indicate the code (e.g., as used on Scantron™ forms).

In one embodiment, the application 121 sends a notification to the record-storage service 112 indicating that the check has been printed. The record-storage service 112 updates the target transaction record 113 to reflect that the instrument has been printed.

After the code has been added to the instrument, the first user presents the instrument to the second user to initiate the value transfer associated with the target transaction. For example, if the instrument is a physical check, the first user may hand the check to the second user or send the check to the second user via a postal service. If the instrument is an electronic check, application 121 may send a digital representation of the electronic check (which includes the code).

After the second user receives the instrument, the second user presents the instrument to an institution (e.g., a bank or a credit union) to deposit the value associated with the target transaction into an account the second user holds with the institution. For example, if the instrument is a physical check, the second user may endorse the check and present the check to a teller at a physical location where the institution operates. Alternatively, the second user may scan the check (e.g., via a digital camera associated with the computing device 130) and cause the application 131 to send the resulting digital image of the check to the digital instrument service 153 provided by the institution at a server 150. If the instrument is an electronic check, the application 131 may send the digital representation of the electronic check directly to the digital instrument service 153 without using a scanning device. In another embodiment, application 121 may send the digital representation of the electronic check directly to the digital instrument service 153.

After the instrument has been presented to the institution, the institution initiates a clearing process (e.g., with a clearinghouse via the digital instrument service 153) to effectuate the value transfer associated with the target transaction. In addition, the digital instrument service 153 stores a digital image 154 of the instrument in the data repository 151. The API service 152 makes the digital image of the instrument available via the network 102 to applications authorized by the second user. In addition, the API service 152 may also provide a status (e.g., "pending" or "posted") indicating a current stage of processing for the target transaction to applications authorized by the second user.

The second user may authorize the application 131 to access information associated with the second user's account in the data repository 151. For example, the application 131 may be authorized via an authorization framework that allows the second user to authorize third-party applications to access protected network resources without disclosing the second user's credentials for those resources to the third-party applications. One example of such a framework is the Open Authorization (OAuth) 2.0 Authorization Framework, which was developed by the Internet Engineering Task Force (IETF) and is hereby incorporated by reference (available at https://tools.ietf.org/html/draft-ietf-oauth-v2-31). Another example is described in U.S. patent application Ser. No. 15/650,470 (entitled "Coordinating Access Authorization Across Multiple Systems at Different Mutual Trust Levels"), which is hereby incorporated by reference.

Once the application 131 is authorized, the application 131 sends a request (e.g., via the network 102) to the API service 152 for updated information about activity on the second user's account with the institution. In response, the API service 152 sends information describing activity on the second user's account, including the digital image 154 of the instrument and the status to the application 131.

The application 131 detects the code within the digital image 154 and extracts the code (e.g., via optical character recognition (OCR) or another process). The application 131 sends the code and the status to the record-storage service 112. The application 131 may also send the digital image 154 along with the status and the code. The record-storage service 112 looks up the target transaction record 113 based on the code and updates the target transaction record 113 to reflect the status. The record-storage service 112 may also associate the digital image 154, if received, with the transaction record.

While servers 110, 150 are shown as single units for simplicity in illustration, the functions and features of any server shown may be spread across multiple servers (e.g., in a cloud-computing infrastructure). The network 102, in general, may be a wide area network (WAN), a local area network (LAN), a wireless LAN (WLAN), personal area network (PAN), a cellular network, the Internet, or any other technology that allows devices to communicate electronically with other devices.

In one embodiment, applications 121, 131 may be dedicated applications that are installed and run locally on the computing devices 120, 130, respectively. Such a dedicated application may represent a component of a client server application (or other distributed application) that can communicate with a corresponding server over network 102. For example, a dedicated application may be a "thin" client that directs processing that is mainly performed by a corresponding server. In another embodiment, one or both of applications 121, 131 may web applications executed in browsers on computing devices 120 and 130, respectively. In one embodiment, applications 121, 131 may represent separate instances of a single application and record-storage service 112 may be a back-end component of that single application.

Figure 2:
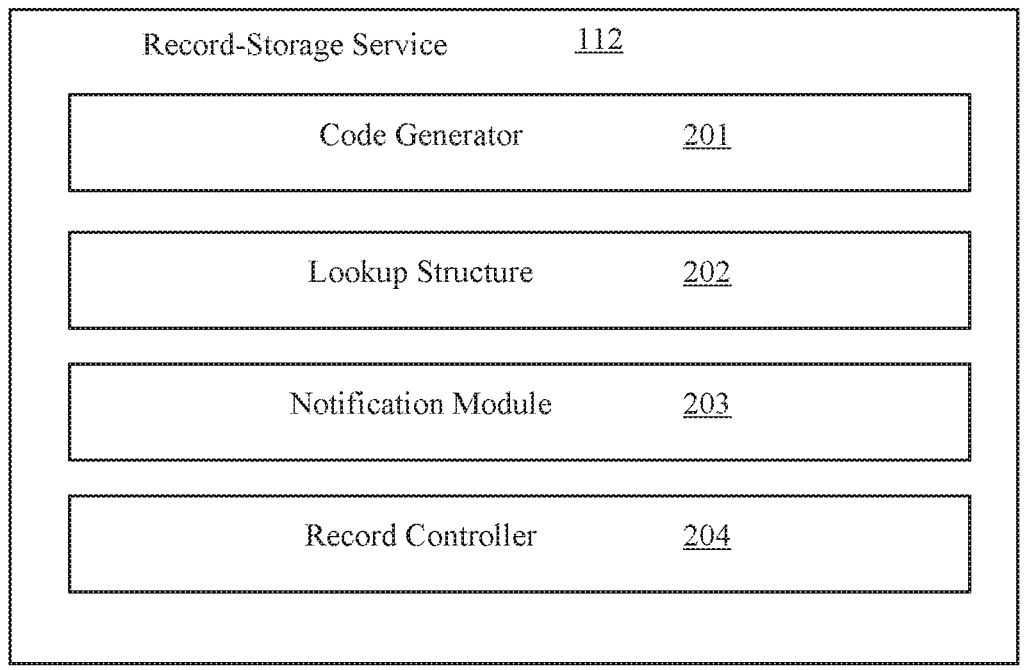
FIG. 2 illustrates a detailed view of a record-storage service, according to one embodiment.

FIG. 2 illustrates a detailed view of the record-storage service 112, according to one embodiment. As shown, the record-storage service 112 includes a code generator 201, a lookup structure 202, a notification module 203, and a record controller 204.

When the record-storage service 112 receives a description of a target transaction (e.g., from application 121 and/or application 131), the record controller 204 creates the target transaction record 113 in the data repository 111. When the record-storage service 112 receives an indication that the value associated with the transaction will be transferred via an instrument, the code generator 201 generates a code to uniquely identify the target transaction. The record controller 204 associates the code with the record of the target transaction in the lookup structure 202. Once a code has been generated for the target transaction, the notification module 203 sends messages to notify the application 121 and the application 131 of what the code is. (Note that, in other embodiments, the code generator 201 may be located at the application 131 rather than at the record-storage service 112. In such embodiments, the record controller 204 may receive the code from the application 131 and associated the code with the target transaction record 113.)

In varying embodiments, different types of codes may be generated. For example, the code generator 201 may generate an alphanumeric code, a bar code, a quick response (QR) code, a steganographically implemented quick response (SIQR) code, or another type of code. In one embodiment, the code generator 201 generates a modified type of QR code. Like other QR codes, the modified QR code may include a grid and may include markers (e.g., solid black squares surrounded by an inner perimeter of whitespace and an outer black perimeter) that serve as reference points to determine a position and alignment of the code. Each cell in the grid of a standard QR code typically encodes a single bit of information. The two possible values of the bit are indicated by the two possible colors of the cell (e.g., black or white after an image of the QR code is binarized). However, each cell in the grid of a modified QR code can encode more than two possible values (and thus multiple bits of information). A cell in the grid of the modified QR code includes a whitespace margin that surrounds an interior region of the cell. The interior region of the cell encodes the possible values based on a number of corners on a shape (or the absence of a shape) included in the interior region. A triangle, for example, has three corners, while a pentagon has five corners, a hexagon has six corners, a five-pointed star has ten corners, etc. In this context, a "corner" is defined as a point on the shape where there is a sharp color gradient (e.g., from black to white) in more than one direction. Each number of corners can be mapped to a possible value for a set of bits corresponding to the cell. For a given shape in a given cell of the modified QR code, a processor can determine the number of corners on the shape via a method such as Harris corner detection. Shapes with up to a threshold number of corners (e.g., 16) may be used such that the number of bits the cell can encode is approximately equal to the base-2 logarithm of the threshold number of corners.

In an alternative embodiment, the code generator 201 may also select the code from a set of codes pre-printed on checks. In this embodiment, the notification module 203 can send a message to the application 121 instructing the first user to fill out the check on which the selected code was pre-printed and to darken a series of machine-readable bubbles to indicate the code manually. The darkened bubbles and the pre-printed code can be compared to each other for error checking purposes.

Regardless of how the code for the target transaction is generated, the code is ultimately included on an instrument used to transfer a value associated with the target transaction. When the digital image 154 of the instrument arrives at the application 131, the application 131 extracts the code from the digital image 154 and sends the code and a transaction status to the record-storage service 112. The record-storage service 112 performs a lookup operation via the lookup structure 202 to identify the transaction record associated with the code extracted from the digital image 154. The record-storage service 112 updates the target transaction record 113 to reflect the status.

The lookup structure 202 can be implemented in many different ways. For example, the lookup structure 202 may be digitally represented by an associative array. An associative array includes a set of key-value pairs. In an associative array, the value of a given key-value pair can be retrieved by providing the key in a manner that conforms to the syntax of the programming language used to implement the associative array. In this example, an associative array that represents the lookup structure 202 has key-value pairs in which each value is a reference to a transaction record and each key is the code associated with the transaction.

In another example, the lookup structure 202 may be digitally represented as a table K in a database (e.g., a relational database, a stateless database, or a non-relational database). In the table K, codes for transactions serve as entries in a primary key column. Identifiers of the transaction records associated with those codes are included as entries in a second column of the table K. For example, one row in table K may have a code as the entry in a primary key column C1 and an identifier of the transaction record associated with that code as the entry in a second column C2. In this example, the record-storage service 112 may retrieve the identifier of the transaction record via a query that includes the code. For example, if the code is "ABC123," the query may be depicted as "SELECT C2 FROM K WHERE C1=ABC123" in Structured Query Language (SQL).

Figure 3:
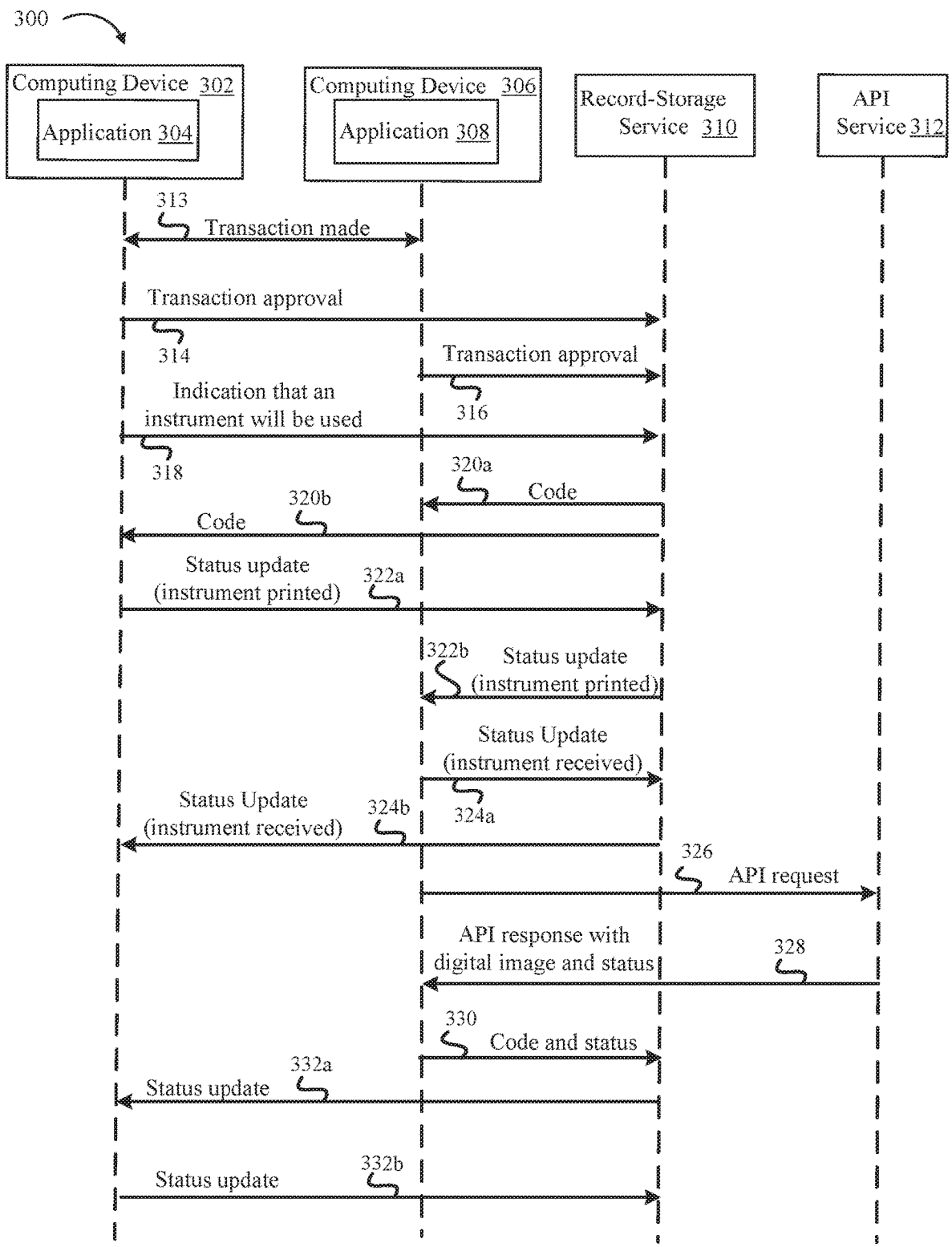
FIG. 3 is a signal diagram illustrating electronic messages that can be sent during a process for instrument disambiguation, according to one embodiment.

FIG. 3 depicts a signal diagram 300 illustrating electronic messages that can be sent during a process for instrument disambiguation, according to one embodiment.

As shown, the signal diagram 300 illustrates communications sent between an application 304 executing at a computing device 302, an application 308 executing at a computing device 306, a record-storage service 310, and an API service 312. A first entity operates the computing device 302, while a second entity operates the computing device 306. Application 304 may be an instance of a record-management application to which the first entity has logged on via the computing device 302. Similarly, application 308 may be an instance of the record-management application to which the second entity has logged on via the computing device 306. The record-storage service 310 stores and manages transaction records for application 304 and application 308. The API service 312 is operated by an institution with which the second entity has one or more accounts to which value may be transferred via an instrument.

As shown at arrow 313, the one or more communications are exchanged between application 304 and application 308 to create the transaction between the first entity and the second entity. For example, application 304 may send a communication to application 308 indicating a product or service the first entity wishes to receive from the second entity. Application 308 may send an offer communication to application 304 indicating that the second entity offers requested product or service for a specified price. The offer communication may also include contractual terms for the proposed sale (e.g., warranty details, terms for refunds, an arbitration clause, etc.). In response, application 304 can send a communication indicating that the first entity accepts the offer (e.g., via a digital signature) so that a contract is formed for the target transaction.

As shown at arrow 314, the application 304 sends an approval message to the record-storage service 310 indicating the first entity approves of the target transaction. Similarly, at arrow 316, the application 308 sends an approval message to the record-storage service 310 indicating the second entity approves of the target transaction. At least one of the approval messages includes a description of the transaction (e.g., including an amount of value, a date, and a description). In some embodiments, both approval messages include descriptions that the record-storage service 310 compares to each other to ensure consistency. If the descriptions are not consistent, the record-storage service 310 sends an error message to applications 304, 308. Otherwise, the record-storage service 310 creates a transaction record for the target transaction.

As shown at arrow 318, the application 304 sends a message to the record-storage service 310 indicating that the first entity plans to transfer a value associated with the transaction to the second entity via an instrument (e.g., a check). (In some embodiments, this message may be combined with the message sent at arrow 314 or arrow 316.) In response, the record-storage service 310 generates a code to uniquely identify the target transaction. In an alternative embodiment, the application 304 sends the message indicating an instrument will be used directly to the application 308. In this alternative embodiment, the application 308 generates the code and sends the code to the record-storage service 310. The record-storage service 310 associates the code with the transaction record (e.g., by adding the code to the transaction record or adding an entry to a lookup structure that maps the code to the transaction).

At arrow 320a and 320b, the record-storage service 310 sends the code to the application 304 and the application 308, respectively. In embodiments where the code was generated by the application 308 rather than the record-storage service 310, the message indicated by arrow 320a can be omitted. Also, in some embodiments, the application 308 (rather than the record-storage service 310) can send the code directly to the application 304.

Once the application 304 receives the code, the application 304 includes the code on the instrument (e.g., by printing the code onto the instrument via a printer). At arrow 322a, the application 304 sends a message with the code to the record-storage service 310 indicating that the instrument has been printed. The record-storage service 310 uses the code to look up the transaction record and updates a status attribute for the target transaction to reflect that the instrument has been printed. At arrow 322*b*, the record-storage service 310 sends a message indicating the status update to the application 308. Alternatively, in some embodiments, the messages indicated by arrows 322*a*, 322*b* can be omitted.

The first entity provides the instrument to the second entity. Optionally, the second entity may scan the check (e.g., via a digital camera associated with the computing device 306) to create a digital image. The application 308 may extract the code from the image. At arrow 324*a*, the application 308 sends a message with the code to the record-storage service 310 indicating that the check has been received by the second entity. The record-storage service 310 uses the code to look up the transaction record and updates a status attribute for the target transaction to reflect that the instrument has been received by the second entity. Optionally, the message may also include the digital image of the instrument. The record-storage service 310 can associate the digital image with the transaction record. At arrow 324*b*, the record-storage service notifies the application 304 of the status update. Alternatively, in some embodiments, the messages indicated by arrows 324*a*, 324*b* can be omitted.

The second entity conveys the instrument to the institution with which the second entity has an account (e.g., by sending the digital image to the institution or by physically delivering the instrument). The API service 312 can access information describing the instrument that the institution stores in an electronic repository, including a digital image of the instrument (which may have been scanned by the institution or provided by the application 308).

At arrow 326, the application 308 sends an API message to the API service 312 requesting information about activity that has occurred on the account within a specific time period. At arrow 328, the API service 312 sends the requested information, including the digital image of the instrument and a current status associated with the instrument (e.g., "pending" or "posted"). Typically, this digital image was created by scanning equipment operated by the institution (unlike the digital image that may have been sent at arrow 324*a*, which was scanned by equipment associated with application 308 or application 304).

The application 308 identifies and extracts the code from the digital image that was received from the API service 312. At arrow 330, the application 308 sends the code and the current status associated with the instrument (e.g., "pending" or "posted," as indicated by the API service 312 at arrow 328) to the record-storage service 310. The record-storage service 310 uses the code to look up the transaction record, then updates the transaction record with the current status.

At arrow 332*a* and arrow 332*b*, the record-storage service 310 notifies the application 304 and the application 308 of the current status, respectively. Alternatively, in some embodiments, the messages indicated by arrows 332*a*, 332*b* can be omitted.

In some embodiments, some of the communication indicated in the signal diagram 300 may occur in different orders. Also, in some embodiments, some of the communications may be omitted or combined with other communications.

Figure 4:
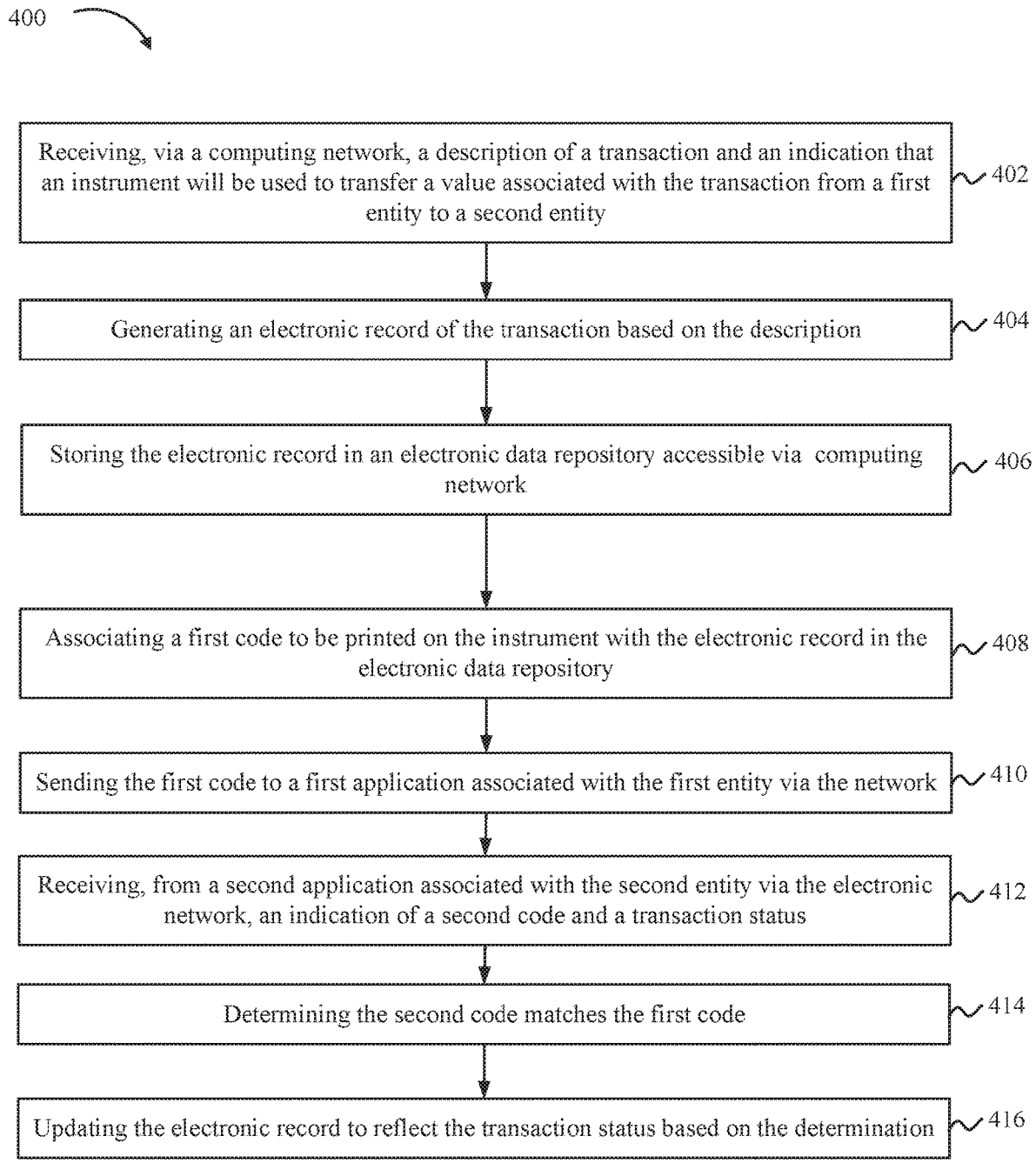
FIG. 4 illustrates example operations for instrument disambiguation, according to one embodiment.

FIG. 4 illustrates example operations 400 for instrument disambiguation, according to one embodiment. The operations 400 can be implemented as a method or the operations 400 can be executed as instructions on a machine (e.g., by one or more processors), where the instructions are included on at least one non-transitory computer-readable storage medium.

As illustrated in block 402, the operations 400 include receiving, via a computing network, a description of a transaction and an indication that an instrument will be used to transfer a value associated with the transaction from a first entity to a second entity. The description and the instrument may be received in the same message or in different messages. In some embodiments, the description and the instrument may be received from a second application associated with the second entity. Also, in some embodiments, an acknowledgement of the transaction is received from a first application associated with the first entity.

As illustrated in block 404, the operations 400 include generating an electronic record of the transaction based on the description. The electronic record may, for example, include an amount (e.g., in units of a currency) of the value, a timestamp for when the electronic record is generated, an identifier of the first entity, and an identifier of the second entity.

As illustrated in block 406, the operations 400 include storing the electronic record in an electronic data repository accessible via the computing network. The electronic data repository may be a distributed blockchain database or a hash chain structure (e.g., as disclosed in U.S. patent application Ser. No. 15/645,823, entitled "Secure Token Passing via Hash Chains," which is hereby incorporated by reference).

As illustrated in block 408, the operations 400 include associating a first code to be printed on the instrument with the electronic record in the electronic data repository. In one embodiment, the first code may represented by an alphanumeric code, a bar code, a quick response (QR) code, a steganographically implemented quick response (SIQR) code, a modified type of QR code, or some other type of code that serves as an identifier for the transaction.

In some embodiments, the first code may be generated by a server-side record-storage service and sent to a second application (e.g., a client-side application) associated with the second entity. In other embodiments, the first code may be generated by the second application (e.g., a client-side application) and received at the server-side record-storage service via the computing network. However, typically only one of the record-storage service or the second application, but not both, generates codes for transactions. In either case, the operations 400 may include verifying the first code is not currently associated with another record existing in the electronic repository before associating the first code with the electronic record. If an existing record is already associated with the generated code, the record-storage service can note the conflict in an error log and generate (or request) another code. Codes may be generated randomly (e.g., using a seed), sequentially, or in some other way.

As illustrated in block 410, the operations 400 include sending the first code to a first application associated with the first entity via the network. In some embodiments, the operations 400 may also include sending a message for the first entity along with the first code via the network to the first application. The message may instruct the first entity to manually add the first code to the instrument by darkening a series of machine-readable bubbles printed on the instrument or by transcribing the code onto the instrument.

In some embodiments, the operations 400 may also include receiving, from the first application via the computing network, a digital image of the instrument and an indication that the instrument has been printed; associating the digital image with the electronic record; updating the electronic record to reflect that the instrument has been printed; and sending a notification to the second application indicating that the instrument has been printed.

As illustrated in block 412, the operations 400 include receiving, from the second application associated with the second entity via the electronic network, an indication of a second code and a transaction status. The second code was printed on an instrument being used to effectuate a transfer of value to the second entity.

In some embodiments, the operations 400 may also include receiving, from the second application via the computing network before the second code is received, a digital image of the instrument and an indication that the second entity has received the instrument; associating the digital image with the electronic record; updating the electronic record to reflect that the instrument has been received by the second entity; and sending a notification to the first application indicating that the instrument has been received by the second entity.

As illustrated in block 414, the operations 400 include determining the second code matches the first code. Since the first code and the second code match, the value instrument maps to the transaction for which the first code was generated.

As illustrated in block 416, the operations 400 include updating the electronic record to reflect the transaction status based on the determination. For example, if the transaction status is "posted," a status attribute in the electronic record may be changed to "posted." In one embodiment, the operations 400 further include sending an indication of the transaction status to the first application and the second application via the computing network.

Figure 5:
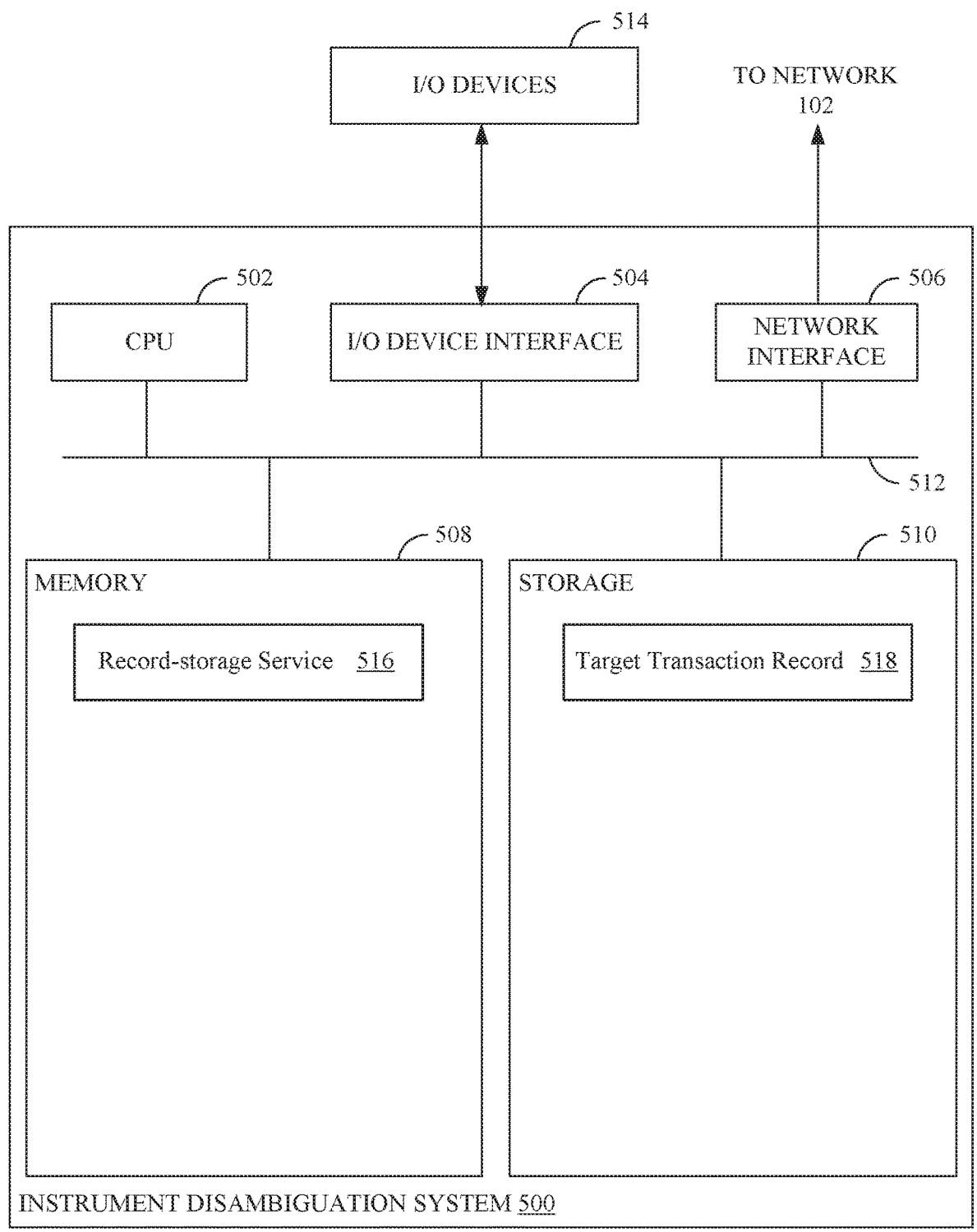
FIG. 5 illustrates an instrument disambiguation system, according to one embodiment.

FIG. 5 illustrates an instrument disambiguation system 500, according to an embodiment. As shown, the instrument disambiguation system 500 includes, without limitation, a central processing unit (CPU) 502, at least one I/O device interface 504 which may allow for the connection of various I/O devices 514 (e.g., keyboards, displays, mouse devices, pen input, speakers, microphones, motion sensors, etc.) to the instrument disambiguation system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 can represent a single CPU, multiple CPUs, a single CPU having multiple processing cores, and the like. Additionally, the memory 508 represents random access memory. Furthermore, the storage 510 may be a disk drive. Although shown as a single unit, the storage 510 may be a combination of fixed or removable storage devices, such as fixed disc drives, removable memory cards or optical storage, network attached storage (NAS), or a storage area-network (SAN).

As shown, memory 508 includes a record-storage service 516. Storage 510 includes a target transaction record 518.

The instrument disambiguation system 500 can operate in the following manner. When the record-storage system 516 receives a description of a transaction between a first entity and a second entity from an application, the record-storage service 516 creates the target transaction record 518 to record the details of the transaction. Upon receiving an indication that an instrument (e.g., check) will be used to effectuate a value transfer between the two entities for the transaction, the record-storage service associates a code to be included (e.g., printed) on the instrument with the record and sends the code to an application that will be used to generate the instrument. Subsequently, the record-storage service 516 receives information imported from electronic records provided by a third-party institution with which the second entity has an account (e.g., via an API). The information describes an instrument that was received as a deposit to the second entity's account. The information also includes a code provided on the instrument and a status (e.g., "pending" or "posted"). Upon determining that the code provided on the instrument matches the code associated with the target transaction record 518, the record-storage service 516 updates the target transaction record 516 to reflect the status.

Figure 6A:
FIG. 6A illustrates two examples of instruments with codes printed thereon, according to one embodiment.

FIG. 6A illustrates two examples of instruments with codes printed thereon, according to one embodiment.

Check 601 includes a standard bar code 602. The bar code 602 encodes the alphanumeric code "I8ABJUST4U2C." The alphanumeric code identifies a transaction for which the check 601 can be used to effectuate an exchange of value.

Check 603 shows another example of how the alphanumeric code can be represented on an instrument. As shown, check 603 includes standard QR code 604. The QR code 604 also encodes the alphanumeric code "I8ABJUST4U2C." Again, the alphanumeric code identifies a transaction for which the check 603 can be used to effectuate an exchange of value.

Figure 6B:
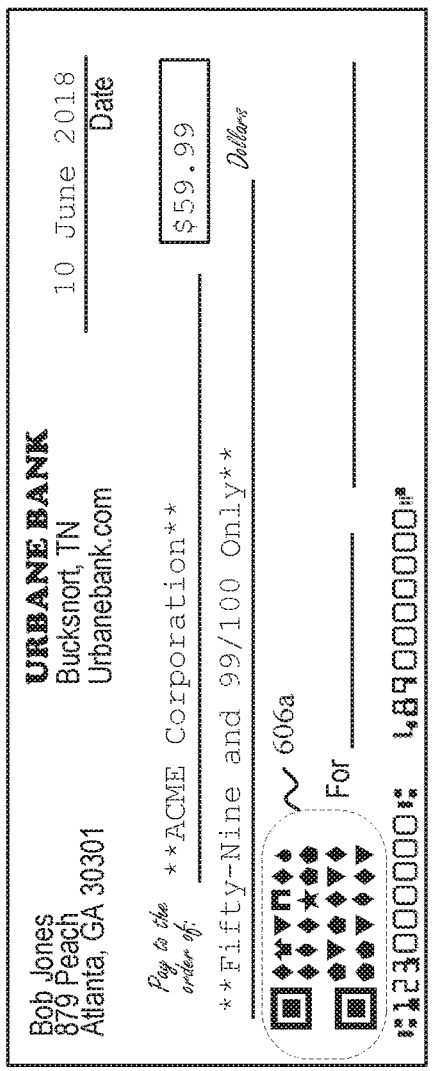
FIG. 6B illustrates another example of an instrument with a code printed thereon, according to one embodiment.
Figure 6B:
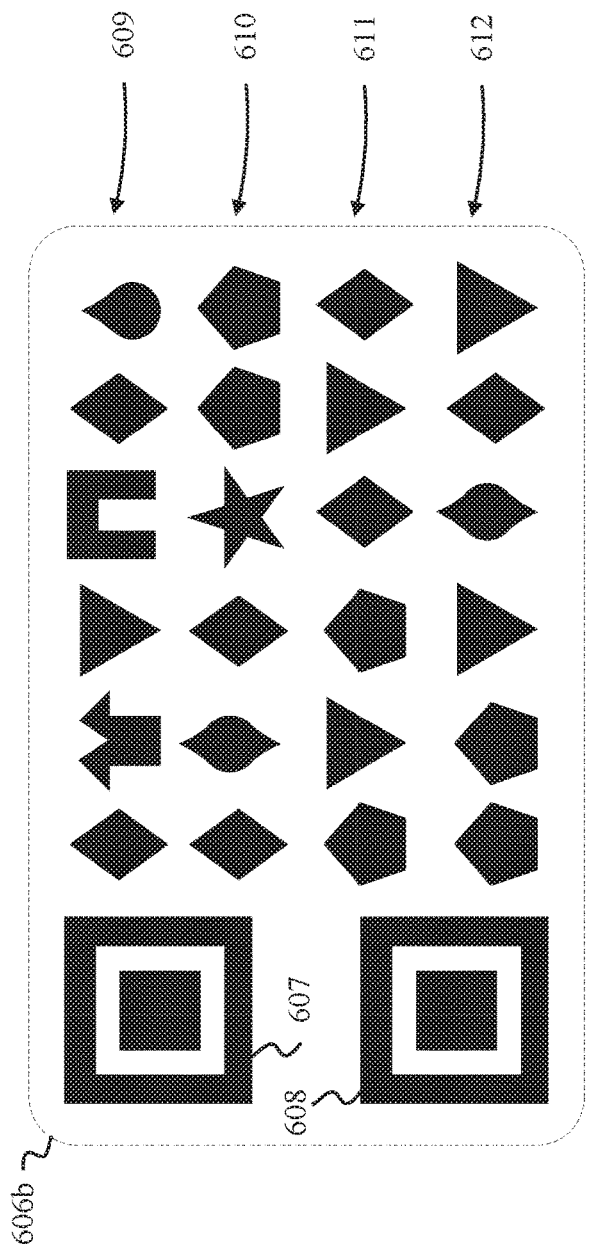

FIG. 6B illustrates another example of an instrument with a code printed thereon, according to one embodiment. Check 605 includes a modified QR code 606a. The modified QR code 606a encodes the alphanumeric code "I8ABJUST4U2C." The alphanumeric code identifies a transaction for which the check 605 can be used to effectuate an exchange of value.

Modified QR code 606b is an enlarged view of modified QR code 606a. As shown, the modified QR code 606b includes finder pattern 607 and finder pattern 608. In addition, the modified QR code 606b also includes rows 609-612. In this example, each character of the alphanumeric code is represented by two shapes. The shapes are arranged in order from left to right and from top to bottom. Hence, row 609 represents the characters "I8A," row 610 represents the characters "BJU," row 611 represents the characters "ST4," and row 612 represents the characters the characters "U2C." To translate the code, a processor applies the Harris corner detection method to count the number of corners on each shape in rows 609-612.

In this example, suppose that sixteen is the predetermined threshold number of corners that a shape in modified QR code 606b is allowed. The processor determines that the base-2 logarithm of the threshold is four. Next, for each shape in the modified QR code 606b, the processor determines the four-bit binary representation of the shape's number of corners (because four is the base-2 logarithm of the threshold).

Next, the processor concatenates consecutive pairs of the resulting four-bit binary representations. For example, as shown, the first shape in row 609 has four corners and the second shape in row 609 has nine corners. The processor determines the binary representation of four (e.g., in the 2s complement scheme of binary encoding), which is "0100." The processor also determines the binary representation of nine, which is "1001." The processor concatenates these two binary representations to form the eight-bit binary representation "01001001," which is the 8-bit representation of the American Standard Code for Information Interchange (ASCII) index corresponding to the first character of the alphanumeric code. Since "01001001" is the eight-bit representation of 73, the processor determines that the first character of the alphanumeric code is "I" (which is character number 73 in ASCII). The processor applies the same process to the third and fourth shapes in row 609 to determine the second character of the alphanumeric code. The processor applies this process to the remaining shapes to determine the remaining characters in the alphanumeric code.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for instrument disambiguation, the method comprising:
   receiving, at a server via a computing network, a description of a transaction and an indication that an instrument will be used to transfer a value associated with the transaction from a first entity to a second entity;
   generating by the server, an electronic record of the transaction based on the description of the transaction, wherein the electronic record comprises at least:
   the value associated with the transaction;
   an identifier of the first entity; and
   an identifier of the second entity;
   storing, by the server, the electronic record of the transaction in an electronic data repository;
   generating, by the server, a code for uniquely identifying the transaction to be included on the instrument;
   associating, by the server, the code with the electronic record of the transaction in the electronic data repository;
   sending, by the server, the code to a first application associated with the first entity and to a second application associated with the second entity;
   receiving, at the server from the second application associated with the second entity, a first transaction status and the code;
   identifying, by the server, the electronic record of the transaction based on the code received from the second application; and
   updating, by the server, the electronic record of the transaction to reflect the first transaction status.

2. The method of claim 1, further comprising:
   receiving, at the server, from the first application, a digital image of the instrument and an indication that the instrument has been printed;
   associating, by the server, the digital image with the electronic record of the transaction;
   updating, by the server, the electronic record of the transaction to reflect that the instrument has been printed; and
   sending, by the server, a notification to the second application indicating that the instrument has been printed.

3. The method of claim 1, further comprising:
   receiving, at the server, from the second application digital image of the instrument and an indication that the second entity has received the instrument;
   associating, by the server, the digital image with the electronic record of the transaction;
   updating, by the server, the electronic record of the transaction to reflect that the instrument has been received by the second entity; and
   sending, by the server, a notification to the first application indicating that the instrument has been received by the second entity.

4. The method of claim 1, further comprising:
   verifying, by the server, the code is not currently associated with another record existing in the electronic data repository before associating the code with the electronic record of the transaction.

5. The method of claim 1, further comprising: sending, by the server, an indication of the first transaction status to the first application and the second application.

6. The method of claim 1, further comprising: sending, by the server, a message for the first entity along with the code to the first application, wherein the message instructs the first entity to manually add the code to the instrument by darkening a series of machine-readable bubbles printed on the instrument or by transcribing the code onto the instrument.

7. The method of claim 1, further comprising:
receiving, at the server from the first application, a second transaction status;
updating, by the server, the electronic record of the transaction to reflect the second transaction status; and
sending, by the server, an indication of the second transaction status to the second application.

8. A non-transitory computer-readable storage medium containing instructions that, when executed by one or more processors of a server, perform an operation for instrument disambiguation, the operation comprising:
receiving, at the server via a computing network, a description of a transaction and an indication that an instrument will be used to transfer a value associated with the transaction from a first entity to a second entity;
generating, by the server, an electronic record of the transaction based on the description of the transaction, wherein the electronic record comprises at least:
the value associated with the transaction;
an identifier of the first entity; and
an identifier of the second entity:
storing, by the server, the electronic record of the transaction in an electronic data repository;
generating, by the server, a code for uniquely identifying the transaction to be included on the instrument;
associating, by the server, the code with the electronic record of the transaction in the electronic data repository;
sending, by the server, the code to a first application associated with the first entity and to a second application associated with the second entity;
receiving, at the server from the second application associated with the second entity, a first transaction status and the code;
identifying, by the server, the electronic record of the transaction based on the code received from the second application; and
updating, by the server, the electronic record of the transaction to reflect the first transaction status.

9. The non-transitory computer-readable storage medium of claim 8, wherein the operation further comprises:
receiving, at the server, from the first application, a digital image of the instrument and an indication that the instrument has been printed;
associating, by the server, the digital image with the electronic record of the transaction;
updating, by the server, the electronic record of the transaction to reflect that the instrument has been printed; and
sending, by the server, a notification to the second application indicating that the instrument has been printed.

10. The non-transitory computer-readable storage medium of claim 8, wherein the operation further comprises:
receiving, at the server, from the second application, a digital image of the instrument and an indication that the second entity has received the instrument;
associating, by the server, the digital image with the electronic record of the transaction;
updating, by the server, the electronic record of the transaction to reflect that the instrument has been received by the second entity; and
sending, by the server, a notification to the first application indicating that the instrument has been received by the second entity.

11. The non-transitory computer-readable storage medium of claim 8, wherein the operation further comprises:
verifying, by the server the code is not currently associated with another record existing in the electronic data repository before associating the code with the electronic record of the transaction.

12. The non-transitory computer-readable storage medium of claim 8, wherein the operation further comprises:
sending, by the server, an indication of the first transaction status to the first application and the second application.

13. The non-transitory computer-readable storage medium of claim 8, wherein the electronic data repository comprises a distributed blockchain database.

14. The non-transitory computer-readable storage medium of claim 8, wherein the operation further comprises:
receiving, at the server from the first application, a second transaction status;
updating, by the server, the electronic record of the transaction to reflect the second transaction status; and
sending, by the server, an indication of the second transaction status to the second application.

15. A system comprising:
one or more processors; and
memory storing one or more applications that, when executed on the one or more processors, perform an operation for instrument disambiguation, the operation comprising:
receiving, at the system, a description of a transaction and an indication that an instrument will be used to transfer a value associated with the transaction from a first entity to a second entity;
generating, by the system, an electronic record of the transaction based on the description of the transaction, wherein the electronic record comprises at least:
the value associated with the transaction;
an identifier of the first entity; and
an identifier of the second entity:
storing, by the system, the electronic record of the transaction in an electronic data repository;
generating, by the system, a code for uniquely identifying the transaction to be included on the instrument;
associating, by the system, the code with the electronic record of the transaction in the electronic data repository;
sending, by the system, the code to a first application associated with the first entity and to a second application associated with the second entity;
receiving, at the system from the second application associated with the second entity, a first transaction status and the code;
identifying, by the system, the electronic record of the transaction based on the code received from the second application; and
updating, by the system the electronic record of the transaction to reflect the first transaction status.

16. The system of claim 15, wherein the operation further comprises:

receiving, at the system, from the first application, a digital image of the instrument and an indication that the instrument has been printed;

associating, by the system, the digital image with the electronic record of the transaction;

updating by the system, the electronic record of the transaction to reflect that the instrument has been printed; and sending, by the system, a notification to the second application indicating that the instrument has been printed.

17. The system of claim 15, wherein the operation further comprises:

receiving, at the system, from the second application, a digital image of the instrument and an indication that the second entity has received the instrument;

associating by the system, the digital image with the electronic record of the transaction;

updating, by the system, the electronic record of the transaction to reflect that the instrument has been received by the second entity; and sending, by the system, a notification to the first application indicating that the instrument has been received by the second entity.

18. The system of claim 15, wherein the operation further comprises:

verifying, by the system, the code is not currently associated with another record existing in the electronic repository before associating the code with the electronic record of the transaction.

19. The system of claim 15, wherein the operation further comprises: sending by the system, an indication of the first transaction status to the first application and the second application.

20. The system of claim 15, wherein the operation further comprises:

receiving, at the system from the first application, a second transaction status;

updating, by the system, the electronic record of the transaction to reflect the second transaction status; and sending, by the system, an indication of the second transaction status to the second application.

* * * * *